United States Patent

McKusick

[15] 3,700,689

[45] Oct. 24, 1972

[54] 2(SUBSTITUTED PHENYL)-8H-PYRAZOLO-(5,1A)ISOINDOL-8-ONE

[72] Inventor: Blaine Chase McKusick, Wilmington, Del.

[73] Assignee: E. I. du Pont de Nemours and Company, Wilmington, Del.

[22] Filed: Dec. 10, 1970

[21] Appl. No.: 97,030

[52] U.S. Cl. ................................260/310 R, 71/76
[51] Int. Cl. ............................................C07d 57/24
[58] Field of Search.......................................260/310

[56] References Cited

UNITED STATES PATENTS 3,409,425   11/1968   Bousquet..................260/310

*Primary Examiner*—Henry R. Jiles
*Assistant Examiner*—Harry I. Moatz
*Attorney*—Anthony P. Mentis

[57] ABSTRACT

Certain 8H-pyrazolo[5,1-a]isoindol-8-ones are effective plant growth modifiers.

5 Claims, No Drawings

2(SUBSTITUTED PHENYL)-8H-PYRAZOLO-(5,1A)ISOINDOL-8-ONE

BACKGROUND OF THE INVENTION

1. Field of the Invention

This invention relates to 8H-pyrazolo[5,1-*a*]-isoindol-8-ones having a phenyl or substituted phenyl in the 2-position and use of these compounds as plant growth modifier when applied to plants.

Description of Prior Art

It has been shown in Bousquet U.S. Pat. No. 3,407,206 and U.S. Pat. No. 3,409,425 that 2-substituted-3,3a-dihydropyrazoloisoindolones of the formula

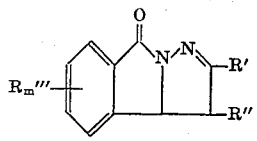

(wherein R' can include phenyl, halophenyl, alkylphenyl, or alkoxyphenyl; R'' can be H; R''' can be H or halogen, and *m* is an integer of up to 5) are plant growth regulants.

DESCRIPTION OF THE INVENTION

The basic pyrazolo[5,1-*a*]isoindole ring system has been given the following numbering in the "Ring Index":

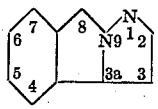

The compounds of this invention have unsaturation at the 3 and 3a bond, an oxo group attached to the 8-position and nuclear carbon of a phenyl group attached to the 2-position. At the 3-position hydrogen is present and the 4, 5, 6, and 7-positions preferably have hydrogen on this aromatic ring.

We have now obtained 8H-pyrazolo[5,1-*a*]isoindol-8-ones of the formula

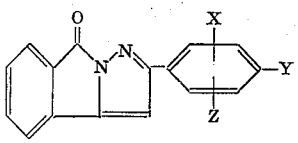

wherein X, Y, and Z, alike or different, are H, alkyl of up to four carbon atoms, alkoxy of up to four carbon atoms, halogen, or nitro, and with preferably at least two being hydrogen. These new compounds are useful in controlling or regulating the growth of plants.

The new compounds are prepared by dehydrogenation of the corresponding 3,3a-dihydropyrazolo[5,1-*a*]-isoindol-8-one. Although dichlorodicyanobenzoquinone is an effective agent, other oxidizing agents effective in solution are useful.

The 3,3a-dihydro compounds are available by the process of U.S. Pat. Nos. 3,407,206 and 3,409,425. The reaction involves that of acetophenone or a substituted acetophenone with phthalaldehydic acid in the presence of a base to give upon acidification, a 3-phenacylphthalide which is then reacted with hydrazine as shown by the following equations:

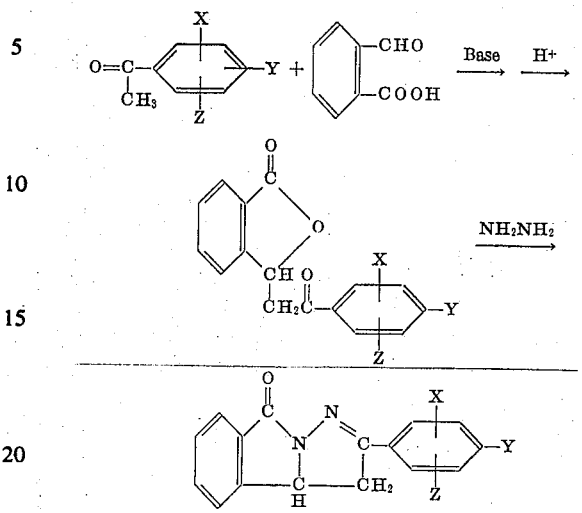

The latter on oxidation gives the compounds

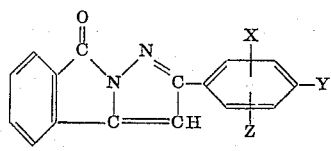

The 3,3a-dihydro-8H-pyrazolo[5,1-*a*]isoindol-8-ones are prepared in the following manner. Phthalaldehydic acid is treated in the presence of a base with a ketone; i.e., acetophenone or substituted acetophenone. Generally, inert solvents such as ethanol, methanol, acetonitrile and benzene are preferred for the reaction along with bases such as potassium and sodium hydroxide. It is desirable to have more than one equivalent of base.

The mixture is stirred for 1 to 6 hours at 20° to 80°C, 25° to 35°C being preferred. The reaction is essentially complete and is so indicated by precipitation of the compound, by disappearance of the peak attributable to the aldehyde group in the infrared spectrum or by other appropriate means. The solution is diluted with water and acidified, usually with concentrated hydrochloric acid, which completes the precipitation of essentially pure 3-substituted phthalide. Further purification can be effected by recrystallization from an appropriate solvent such as benzene, acetonitrile or ethanol.

A mixture of the 3-substituted phthalide and hydrazine, usually as the hydrochloride, sulfate or hydrate, in an inert solvent such as aqueous ethanol or methanol is heated to near reflux. It is desirable to use an excess of one of the reactants. After a few minutes, an excess of triethylamine is added gradually, and the mixture is heated at reflux for 1 to 3 hours. The cooled solution is acidified, generally with hydrochloric acid and then reheated at reflux for about 30 minutes. The solution is thereafter cooled, reduced in volume, and diluted with sufficient water to separate essentially pure substituted 3,3a-dihydro-8H-pyrazolo[5,1-*a*]isoindol-8-ones. Further purification is effected by washing the compound with dilute aqueous base and by recrystallization from an appropriate solvent such as benzene, acetonitrile, ethanol or nitromethane.

Examples of the preparation of representative 3,3a-dihydro-8H-pyrazolo[5,1-a]isoindol-8-ones obtained by the above general procedure are shown in Table 1.

TABLE I

| Ex. | Substituted Ketone | Phthalide | Substituted 3,3a-Dihydropyrazolo [5, 1-a]isoindolones |
|---|---|---|---|
| A | 2'-chloro-acetophenone | 3-(o-chlorophenacyl)phthalide | 2(o-chlorophenyl)-3,3a-dihydro-8H-pyrazolo [5,1-a]isoindol-8-one |
| B | 2'-fluoro-acetophenone | 3-(o-fluorophenacyl)phthalide | 2-(o-fluorophenyl)-3,3a-dihydro-8H-pyrazolo[5,1-a]isoindol-8-one |
| C | 4'-bromo-acetophenone | 3-(p-bromophenacyl)phthalide | 2-(p-bromophenyl)-3,3a-dihydro-8H-pyrazolo [5,1-a]isoindol-8-one |
| D | 4'-iodo-acetophenone | 3-(p-iodophenacyl)phthalide | 2-(p-iodophenyl)-3,3a-dihydro-8H-pyrazolo[5,1-a]isoindol-8-one |
| E | 4'-butoxy-acetophenone | 3-(p-butoxyphenacyl)phthalide | 2-(p-butoxyphenyl)-3,3a-dihydro-8H-pyrazolo [5,1-a]isoindol-8-one |
| F | 3'-nitro-acetophenone | 3-(m-nitrophenacyl)phthalide | 3,3a-dihydro-2-(m-nitrophenyl)-8H-pyrazolo[5,1-a]isoindol-8-one |
| G | 3',4',5'-trichloro-acetophenone | 3-(3,4,5-trichloro-phenacyl) phthalide | 3,3a-dihydro-2-(3,4,5-trichloro-phenyl)-8H-pyrazolo[5,1-a] isoindol-8-one |
| H | 3',5'-di-tert-butyl-acetophenone | 3-(3,5-di-tert-butylphenacyl) phthalide | 2-(3,5-di-tert-butylphenyl)-3,3a-dihydro-8H-pyrazolo[5,1-a]-isoindol-8-one |
| I | 3',4',5'-trimethyl-acetophenone | 3-(3,4,5-trimethyl-phenacyl) phthalide | 3,3a-dihydro-2-(3,4,5-trimethyl-phenyl)-8H-pyrazolo[5,1-a]-isoindol-8-one |

The oxidizing agents include those effective for dehydrogenation of hydroaromatic compounds. Although sulfur, selenium, palladium, oxides or sulfides of molybdenum can be employed, they require elevated temperatures and may give additional products. Preferred are mild oxidizing agents employed at temperatures of generally less than 150°C in solution in an inert solvent. Included are chloranil, 2,3-dichloro-5,6-dicyano-1,4-benzoquinone, and N-bromosuccinimide.

When the compounds of Table I are dehydrogenated or oxidized according to the procedure of Example I, the names of the products obtained are as in Table II.

TABLE II

| Example | Substituted Pyrazolo[5,1-a]isoindolone |
|---|---|
| A | 2-(o-Chlorophenyl)-8H-pyrazolo[5,1-a]isoindol-8-one |
| B | 2-(o-Fluorophenyl)-8H-pyrazolo[5,1-a]isoindol-8-one |
| C | 2-(p-Bromophenyl)-8H-pyrazolo[5,1-a]isoindol-8-one |
| D | 2-(p-Iodophenyl)-8H-pyrazolo[5,1-]isoindol-8one |
| E | 2-(p-Butoxyphenyl)-8H-pyrazolo[5,1-a]isoindol-8-one |
| F | 2-(m-Nitrophenyl)-8-H-pyrazolo[5,1-a]isoindol-8-one |
| G | 2-(3,4,5-Trichlorophenyl-8H-pyrazolo[5,1-a]isoindol-8-one |
| H | 2-(3,5-Di-tert-butylphenyl)-8H-pyrazolo[5,1-a]isoindol-8-one |
| I | 2-(3,4,5-Trimethylphenyl)-8H-pyrazolo[5,1-a]isoindol-8-one |

SPECIFIC EMBODIMENTS OF THE INVENTION

The following are illustrative examples in which all parts are by weight unless otherwise stated.

EXAMPLE 1

X=Z=H Y=OCH$_3$ 2-(p-Methoxyphenyl)-8H-pyrazolo[5,1-a]isoindole-8-one

A 300 ml flask fitted with a nitrogen ebullator and reflux condenser was charged with 4.72 g (0.0216 mole) of 2,3-dichloro-5,6-di-cyanobenzoquinone and 50 ml of benzene. The mixture was warmed until a solution had formed, then a solution of 12 g (0.0432 mole) of 3,3a-dihydro-2-(p-methoxyphenyl)-8H-pyrazolo[5,1-a]isoindol-8-one in 150 ml hot benzene was added all at once. The resulting mixture was refluxed for 3 hours, then an additional 4.72 g (0.0216 mole) portion of 2,3-dichloro-5,6-dicyanobenzoquinone was added and refluxing was continued for an additional 2.5 hours. The hot mixture was filtered by suction and the precipitate was washed on the filter with a little hot benzene. After air drying the precipitate, which was a deep orange colored gritty solid, weighed 16.1 g and melted on a metal block at 230°–240°C. Refluxing of the filtrate was resumed and continued overnight and an additional 1.1 g of product melting at 232°–240°C was obtained. These products were combined, mixed vigorously with 200 ml H$_2$O, then with a solution of 5.6 g (0.1 mole) potassium hydroxide in 50 ml H$_2$O for one-half hour. The originally orange colored solid turned yellow. It was filtered, washed with water and air dried. It weighed 6.8 g and melted at 185°–186°C on a metal (Fisher) block. After crystallization from acetone it melted at 186°–187°C (yellow needle-shaped crystals).

Analysis:
Calculated for
| | | | |
|---|---|---|---|
| C$_{17}$H$_{12}$N$_2$O$_2$: | C, 73.9; | H, 4.35; | N, 10.14 |
| Found: | C, 73.68; | H, 4.55; | N, 10.20 |

By concentration of the benzene filtrate from the above operation to about 50 ml an additional 4.3 g product, melting at 185°–186°C, was obtained.

By procedures essentially the same as described for Example 1 the following three compounds were prepared:

| Ex. | Starting Compound | Product | MP°C | Calcd for | Analysis C | H | N |
|---|---|---|---|---|---|---|---|
| 2 | 3,3a-dihydro-2-(2,4-xylyl)-8H-pyrazolo-[5,1-a]-isoindol-8-one | 2-(2,4-xylyl)-8H-pyrazolo[5,1-a]isoindol-8-one | 183–184° | $C_{18}H_{14}N_2O$ | 78.83 | 5.11 | 10.22 |
| | | | | Found: | 78.10 | 5.14 | 10.30 |
| 3 | 3,3a-dihydro-2-(p-ethoxyphenyl)-8H-phrazolo-[5,1-a]isoindol-8-one | 2-(p-ethoxyphenyl)-8H-pyrazolo[5,1-a]-isoindol-8-one | 171° | $C_{18}H_{14}N_2O_2$ | 74.50 | 4.83 | 9.66 |
| | | | | Found: | 74.49 | 4.99 | 9.74 |
| 4 | 3,3a-dihydro-2-p-henly-8H-pyrazolo-[5,1-a]-isoindol-8-one | 2-phenyl-8H-pyrazolo-[5,1-a]-isoindol-8-one | 146–147° | $C_{16}H_{10}N_2O$ | 78.00 | 4.07 | 11.39 |
| | | | | Found: | 78.06 | 4.33 | 11.24 |

EXAMPLE 5

An intimate mixture of 2.87 g (0.01 mole) of 3,3a-dihydro-2-(p-methoxyphenyl)-8H-pyrazolo[5,1-a]isoindol-8-one and 0.32 g (0.01 gram atom) of powdered sulfur was placed in an 18 × 150 mm test tube. The vessel was placed in an oil bath heated at 194°–195 °C. The mixture which gradually melted and which was stirred at frequent intervals copiously liberated hydrogen sulfide for about 10 minutes. The vessel was removed from the hot oil bath after about 25 minutes and after cooling the product was pulverized by mixing under about 20 ml of acetone. The acetone mixture was cooled to about −10°, filtered, washed with cold acetone and air dried to give 2.2 g of a yellow solid which melted at 140°–150°C. Crystallization of this product from acetone yielded 1.11 g of yellow crystals melting at 184°–185°C on a metal (Fisher) block and the melting point of this product in admixture with the product of Example 1 was not depressed.

These new compounds are applied to the immediate area where the plant is developing and growing. This includes pre-emergence and post-emergence application.

Low rates of application of the active ingredient from 0.0025 to 8 pounds per acre provides a means for regulating the growth of plants; e.g., growth retardation, epinasty, delayed flowering, preventing of fruit set, carbohydrate enrichment and control of axillary growth. At higher rates of application, from 10 to 40 pounds per acre, compounds of this invention exhibit herbicidal activity on some plant species under specific growth conditions. However, on other plant species these compounds are herbicidal at a rate of 2 pounds per acre or even lower. The compound is applied with conventional agricultural equipment. The actual rate of active ingredient used, of course, must depend on the particular situation, i.e., the actual plant species, its vigor, the time of year and the condition of the soil.

The growth regulant compositions comprise a compound of this invention generally with one or more surface-active agents.

The surface-active agent used in this invention can be a wetting, dispersing or an emulsifying agent which will assist dispersion of the compound. The surface-active agent or surfactant can include such anionic, cationic and nonionic agents as have heretofore been generally employed in plant control compositions of similar type. Suitable surface-active agents are set out, for example, in Searle U.S. Pat. No. 2,426,417; Todd U.S. Pat. No. 2,655,447; Jones U.S. Pat. No. 2,412,510; or Lenher U.S. Pat. No. 2,139,276. A detailed list of such agents is set forth in "Detergents and Emulsifiers Annual" (1965) by John W. McCutcheon, Inc.

In general, less than 10 percent by weight of the surface-active agents will be used in compositions of this invention and ordinarily the amount of surface-active agents will range from 1–5 percent but may even be less than 1 percent by weight.

Plant growth regulant compositions can contain, in addition to a surfactant, finely divided inert diluents such as talcs, natural clays including atapulgite clay and kaolinite clay, pyrophyllite, diatomaceous earths, synthetic fine silicas, calcium silicate, carbonates, calcium phosphates, sulfur, lime and such flours as walnut shell, wheat, redwood, soybean and cottonseed.

The amount of the finely divided inert solid diluent can vary widely but will generally range from 10 to 98 percent by weight of the growth retardant composition. The particle size can vary considerably but will ordinarily be somewhat under 50 microns in the finished formulation. Such compositions are prepared by blending the ingredients and grinding in a hammer mill or an air attrition mill or similar device until uniform powders are obtained which have a particle size smaller than 50 microns. Compositions containing a surface-active agent and a solid inert diluent are preferably wettable powders containing from 25 to 90 percent of pyrazoloisoindolone.

The pyrazoloisoindolones can also be formulated as high strength compositions in which the active ingredient can be present in amounts ranging from 90–99 percent. The remainder of the composition comprises surface-active agents, preferably in amounts of from 0.2 to 2 percent and diluents, as described above. Such compositions are prepared by blending and grinding the ingredients to obtain a homogeneous powder of fine particle size.

Compositions of these plant growth regulants and inert solid diluents can also be formulated into granules and pellets. In such compositions, the diluent will generally range from 65 to 99 percent and the active ingredient can range from 1 to 35 percent.

They can also be used in the preparation of suspension concentrates, e.g., water extendable emulsifiable oil concentrates.

The compound of Example 4, 2-phenyl-8H-pyrazolo-[5,1-a]-isoindol-8-one, is an active pre-emergence herbicide at both 16 and 2 lb. per acre. It inhibits the growth of crabgrass, sorghum, nutsedge, mustard and marigold whereas the corresponding 3,3a-dihydro compound of U. S. Pat. No. 3,409,425 has practically no inhibiting effect on the same plants.

At an application of 2 lb. per acre the compound of Example 1 has a strong inhibiting effect, post emergence, on Johnson grass and crabgrass whereas the saturated analogue has a much weaker action. The compound of Example 1 should not be used, however, where cotton is planted since it appears to have an undesirable effect on this plant.

The compound of Example 1 when applied as a preemergence plant growth regulator at a rate of 1 lb. per acre as a soil mix has no effect on the growth of corn. The saturated analogue, on the other hand, when applied under similar conditions almost kills corn.

The embodiments of the invention in which an exclusive property or privilege is claimed are defined as follows:

1. A compound of the formula

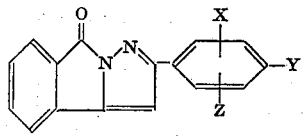

wherein
X, Y and Z, alike or different, are hydrogen, alkyl of up to four carbon atoms, OH, alkoxy of up to four carbon atoms, halogen or nitro.

2. A compound according to claim 1 wherein X and Z are each hydrogen and Y is $OCH_3$.

3. A compound according to claim 1 wherein X and Y are each methyl and Z is hydrogen.

4. A compound according to claim 1 wherein X and Z are each hydrogen and Y is $OC_2H_5$.

5. A compound according to claim 1 wherein X, Y and Z are each hydrogen.

* * * * *